US010384801B2

(12) United States Patent
Filias et al.

(10) Patent No.: US 10,384,801 B2
(45) Date of Patent: Aug. 20, 2019

(54) DEVICE FOR ASSISTING THE PILOTING OF A ROTORCRAFT, ASSOCIATED DISPLAY, AND A CORRESPONDING METHOD OF ASSISTING PILOTING

(71) Applicant: AIRBUS HELICOPTERS, Marignane (FR)

(72) Inventors: Francois-Xavier Filias, Pelissanne (FR); Pierre Zoppitelli, Cabries (FR); Nicolas Belanger, Fos sur Mer (FR); Marc Salesse-Lavergne, Allauch (FR)

(73) Assignee: AIRBUS HELICOPTERS, Marignane (FR)

( * ) Notice: Subject to any disclaimer, the term of this patent is extended or adjusted under 35 U.S.C. 154(b) by 271 days.

(21) Appl. No.: 15/644,439

(22) Filed: Jul. 7, 2017

(65) Prior Publication Data

US 2018/0009546 A1    Jan. 11, 2018

(30) Foreign Application Priority Data

Jul. 11, 2016  (FR) ...................... 16 01075

(51) Int. Cl.
*B64D 45/08*     (2006.01)
*B64C 13/18*     (2006.01)
(Continued)

(52) U.S. Cl.
CPC .............. *B64D 45/08* (2013.01); *B64C 13/18* (2013.01); *B64C 27/57* (2013.01); *B64D 47/08* (2013.01);
(Continued)

(58) Field of Classification Search
CPC ........ B64D 45/08; B64D 47/08; B64C 27/57; B64C 13/18; G08G 5/0021; H04N 5/247;
(Continued)

(56) References Cited

U.S. PATENT DOCUMENTS 4,618,989 A   10/1986 Tsukune et al.
8,977,412 B2 *  3/2015 Certain ................... B64C 13/18
                                                                    701/11
(Continued)

FOREIGN PATENT DOCUMENTS

EP    2977976 A2    1/2016
EP    2996009       3/2016
(Continued)

OTHER PUBLICATIONS

Bu et al.; Vision-based autonomous landing for rotorcraft unmanned aerial vehicle; 2016 IEEE Intl. Conf. on Vehicular Electronics and Safety (ICVES); Beijing, 2016, pp. 77-82 (Year: 2016).*
(Continued)

*Primary Examiner* — Michael J Zanelli
(74) *Attorney, Agent, or Firm* — Brooks Kushman P.C.

(57) ABSTRACT

A device for assisting the piloting of a rotorcraft in order to pilot a rotorcraft during an approach stage preceding a stage of landing on a rotorcraft landing area. Such a device includes in particular a camera for taking a plurality of images of the environment of the rotorcraft along a line of sight, looking at least along a forward direction Dx of the rotorcraft, and processor for identifying in at least one image from among said plurality of images at least one looked-for landing area.

20 Claims, 3 Drawing Sheets

(51) Int. Cl.
| | |
|---|---|
| *B64D 47/08* | (2006.01) |
| *G06K 9/00* | (2006.01) |
| *H04N 5/225* | (2006.01) |
| *H04N 5/232* | (2006.01) |
| *H04N 5/247* | (2006.01) |
| *G08G 5/00* | (2006.01) |
| *G08G 5/02* | (2006.01) |
| *B64C 27/57* | (2006.01) |

(52) U.S. Cl.
CPC ......... *G06K 9/0063* (2013.01); *G08G 5/0021* (2013.01); *G08G 5/025* (2013.01); *H04N 5/2252* (2013.01); *H04N 5/23296* (2013.01); *H04N 5/247* (2013.01)

(58) Field of Classification Search
CPC . H04N 5/2252; H04N 5/23296; G06K 9/0063
See application file for complete search history.

(56) References Cited

U.S. PATENT DOCUMENTS

| | | | | |
|---|---|---|---|---|
| 9,174,747 | B2* | 11/2015 | Kang | B64F 1/18 |
| 9,257,048 | B1 | 2/2016 | Offer et al. | |
| 10,029,804 | B1* | 7/2018 | Chamberlain | B64D 45/08 |
| 2012/0176497 | A1* | 7/2012 | Shadmi | G01C 21/00 |
| | | | | 348/144 |
| 2016/0055754 | A1 | 2/2016 | Ling et al. | |
| 2016/0306363 | A1* | 10/2016 | Wang | G01C 21/005 |

FOREIGN PATENT DOCUMENTS

| | | |
|---|---|---|
| EP | 2977976 A3 | 6/2016 |
| WO | 2014169354 | 10/2014 |

OTHER PUBLICATIONS

French Search Report for French Application No. FR 1601075, Completed by the French Patent Office dated Mar. 3, 2017, 12 Pages.

Peinecke, Proc. SPIE 9087, Degraded Visual Environments: Enhanced, Synthetic, and External Vision Solutions 2014, 90870N Jun. 19, 2014, From Conference vol. 9087, pp. 90870N-1-90870N-6, "Detection of Helicopter Landing Cited in Unprepared Terrain".

Troter et al., International Conference on Image Analysis and Recognition, Porto, Portugal, Oct. 2004, 9 Pages. "Soccer field detection in video images using color and spatial coherence".

* cited by examiner

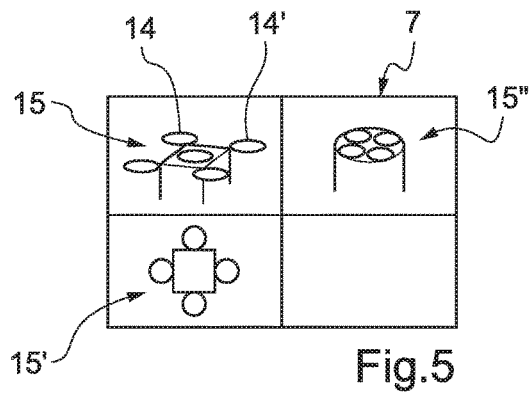
Fig.5
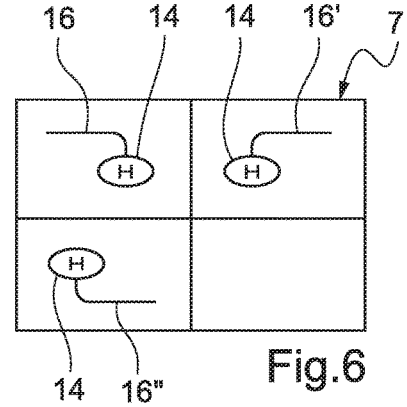
Fig.6
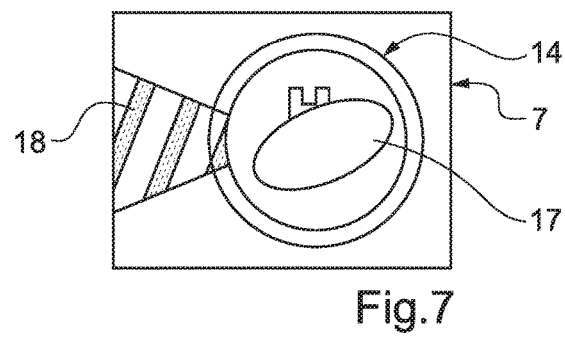
Fig.7
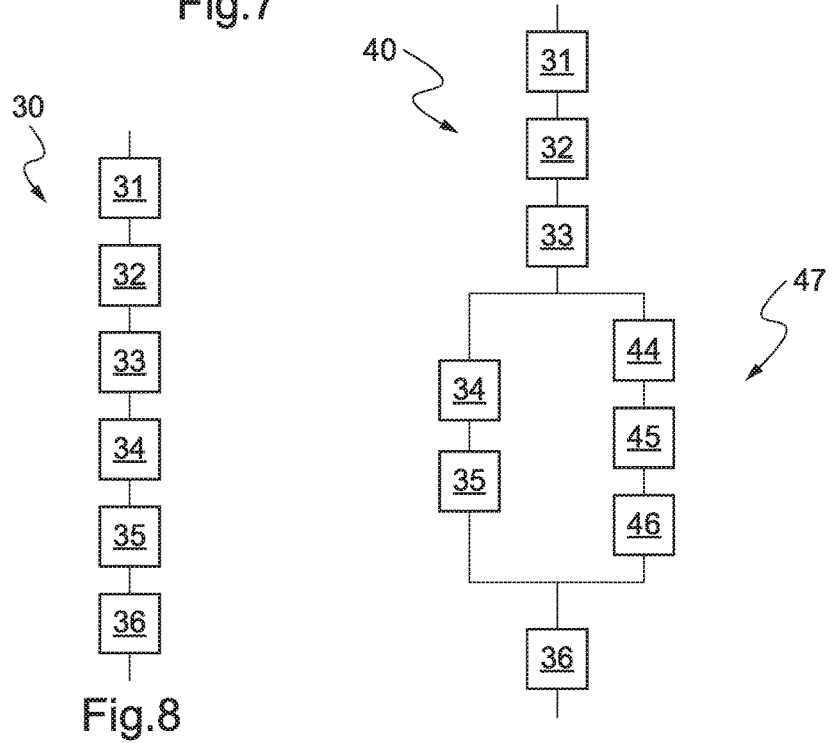
Fig.8
Fig.9

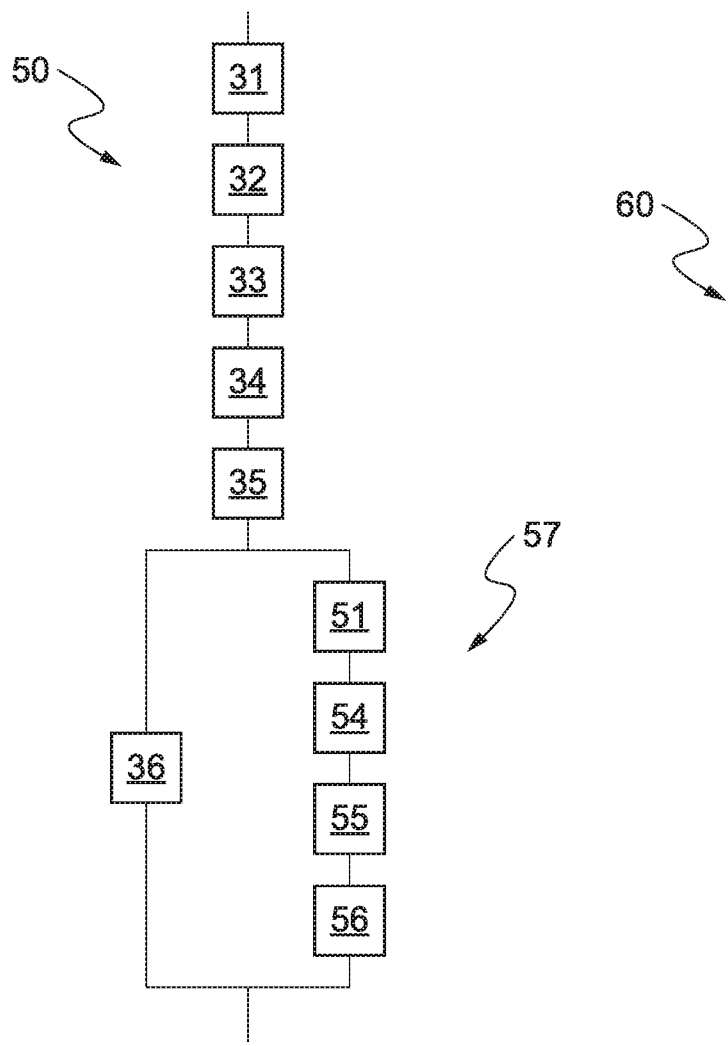
Fig.10
Fig.11

DEVICE FOR ASSISTING THE PILOTING OF A ROTORCRAFT, ASSOCIATED DISPLAY, AND A CORRESPONDING METHOD OF ASSISTING PILOTING

CROSS-REFERENCE TO RELATED APPLICATIONS

This application claims priority to French patent application No. FR 16 01075 filed on Jul. 11, 2016, the disclosure of which is incorporated in its entirety by reference herein.

BACKGROUND OF THE INVENTION

(1) Field of the Invention

The present invention relates to the field of devices for assisting piloting, and to associated methods of assisting piloting, as applicable to rotorcraft. Such devices serve specifically to facilitate guiding a rotorcraft during a stage while the rotorcraft is approaching a prepared rotorcraft landing area such as in particular a helipad, a heliport, or a helideck.

(2) Description of Related Art

Specifically, it can sometimes be complicated for the crew of a rotorcraft to identify the landing area on which the rotorcraft is to land, e.g. when the landing area is arranged on a building, on a vehicle such as a ship or a barge, or on a platform having a plurality of distinct landing areas.

Such identification of the landing area can be found to be even more complicated when the landing area is situated in a group of several buildings or platforms that are geographically close together.

In practice, the crew of a rotorcraft needs to allow additional time in order to perform reconnaissance when a location has a plurality of landing areas. The rotorcraft then needs to carry an additional amount of fuel in order to be able to perform such a reconnaissance operation.

In general, and as described in documents EP 2 996 009 or WO 2014/169354 it is known to provide unmanned aircraft, such as drones, with devices that enable a remote landing area to be identified and then to guarantee that the drone is guided while it is approaching said previously identified landing area. The drone is guided relative to the landing area by means of a camera suitable for detecting the presence of a landing area and for automatically tracking the position of the landing area. Such a camera may in particular be selected to be of the "pan-tilt-zoom" type, i.e. it may have two degrees of freedom to move in rotation relative to a travel direction of the drone, namely through an elevation angle and through a relative bearing angle, and it may also have the ability to zoom towards the landing area.

Nevertheless, although such a device enables a drone to be guided towards a single landing area arranged in the field of view of the camera, it is not adapted to enabling a rotorcraft crew to identify one particular landing area from among a group constituted by a plurality of landing areas that are geographically close to one another.

A method and a system for assisting the piloting of a rotorcraft are also known, as described in "Detection of helicopter landing sites in unprepared terrain" by N. Peinecke, published by Proc. SPIE, June 2014, and referenced as "Document XP 060037261" by the European Patent Office, for providing a pilot of a rotorcraft with information about an unprepared landing site during a stage of landing the rotorcraft.

Under such circumstances, such a landing site is not initially prepared for receiving a rotorcraft. Such landing therefore cannot be considered as taking place on a rotorcraft landing area since such an area is specifically prepared for receiving a rotorcraft, in particular it is provided with special marking.

The system described in that Document XP 060037261 makes it possible to preselect an unprepared type of landing site, e.g. as a function of its size, its orientation, and the layout of the site, for example.

Potential landing sites are then displayed on a monitor screen superimposed in plan view on a radar image of the ground. Such a system then enables the pilot of the rotorcraft to select one such landing site from among those proposed that are situated below the rotorcraft, and then to maneuver the rotorcraft manually in order to land.

Nevertheless, under such circumstances, the system does not describe a camera looking along a line of sight. Nor does it enable images of each of the landing sites to be displayed independently.

Thus, that Document XP 060037261 also does not disclose processor means for identifying, in at least one image from among said plurality of images, at least one potential landing site corresponding to a preselected type of landing site.

Furthermore, the pilot cannot actuate means for selecting a desired landing site, and the system does not include any control unit for generating a control setpoint enabling the rotorcraft to be piloted automatically towards the desired landing site.

A method and a system for assisting the piloting of a rotorcraft are also known, as described in Document EP 2 977 976 A2, for enabling a rotorcraft to be piloted during a stage of landing on a landing site.

Nevertheless, Document EP 2 977 976 A2 does not describe a camera looking along a line of sight so as to display images representative of looked-for landing areas. A camera can be used, but it is used like a radar serving only to provide a plan view of the ground.

Finally, other systems and methods are known for assisting piloting in order to facilitate emergency landing of aircraft on landing sites, such as described in Documents U.S. Pat. No. 9,257,048 B1 and US 2016/055754 A1.

As above, none of those documents describes a camera for taking images along a line of sight and subsequently selecting a landing site from among the various images coming from the camera.

Those various systems and methods are thus more adapted to facilitating piloting a rotorcraft during a stage of landing and not during an approach stage preceding the landing stage.

BRIEF SUMMARY OF THE INVENTION

The present invention thus has the object of proposing a device making it possible to overcome the above-mentioned limitations. In particular, the device and the method of the invention for assisting piloting make it possible to identify a plurality of landing areas of a given type while looking along a line of sight that is looking towards the horizon, and then during an approach stage, to guide a rotorcraft in a direction that is substantially horizontal towards one of those landing areas once it has been selected by the crew of the rotorcraft.

Thus, the invention relates to a device for assisting the piloting of a rotorcraft to enable a rotorcraft to be piloted during an approach stage preceding a stage of landing on a rotorcraft landing area. As mentioned above, such a landing area may in particular be in the form of a helipad, a heliport, or a helideck.

Such a device is remarkable in that it comprises:

preselection means for preselecting a type of landing area to be looked for by the device, the preselection means being actuated by a crew member of the rotorcraft;

at least one camera for taking a plurality of images of the environment of the rotorcraft along a line of sight, the line of sight pointing at least in a forward direction Dx (i.e. the posteroanterior direction) of the rotorcraft;

processor means for identifying in at least one image from among the plurality of images at least one looked-for landing area corresponding to the type of landing area preselected via the preselection means;

a display member for at least displaying an image representative of the looked-for landing area(s);

selection means enabling the crew of the rotorcraft to select a desired landing area from among the looked-for landing area(s); and a control unit for generating a control setpoint enabling the rotorcraft to be piloted automatically substantially horizontally towards the desired landing area.

In other words, the device for assisting piloting enables the crew to view on the display member a plurality of landing areas corresponding to the looked-for type of landing area as preselected via the preselection means. Such landing areas are also distant from the rotorcraft and remote from the rotorcraft in at least a horizontal direction. Such landing areas thus do not constitute unprepared emergency landing sites situated vertically below the rotorcraft. The control setpoint then serves to pilot the rotorcraft over several hundreds of meters or indeed several kilometers along a path that is substantially horizontal.

Such preselection means may in particular be formed by a preselection touch screen on which symbolic images or photos of landing areas are displayed. The pilot or the copilot of the rotorcraft can then select a type of landing area that is to be looked for thereafter by the device and that is to be displayed on the display member.

Furthermore, the processor means serving to identify the looked-for landing area(s) may be constituted by calculation means, processors, or more generally a computer having the necessary calculation power to be able to identify the looked-for landing area(s) in a plurality of images. Such identification of a looked-for landing area takes place in several stages. Initially, it is possible to detect a horizon line using a so-called "gradient" method. More precisely, such a method consists in using a vertical "Sobel" filter on an image. Such a method thus serves to amplify contrasts and to detect horizontal lines. Thereafter, it suffices to find the line that passes through the greatest number of points by using a "Hough" transform. In practice, the horizon line is not exactly straight in an image but rather a parabolic arc.

Detecting the horizon line only approximately is nevertheless not troublesome since detecting the horizon serves merely to eliminate the high portion of the image, which corresponds to the sky and is not directly useful for detecting landing areas.

Furthermore, the processor means take account of the angle of inclination of the rotorcraft about a roll axis by making use of auxiliary onboard instruments giving the attitude of the rotorcraft at all times, and consequently specifying the angle through which the image needs to be turned in order to obtain an upright image corresponding to the rotorcraft having a horizontal attitude.

Once the horizon line has been identified and the sky has been eliminated, the processor means perform a "region-growing" method as described for a different application in the publication by Arnaud Le Troter, Sébastien Mavromatis, and Jean Sequeira, entitled "Soccer field detection in video images using color and spatial coherence"—International Conference on Image Analysis and Recognition, Porto, Portugal, October 2004.

Such a region-growing method then serves to search for dominant colors in an image or a region of interest by colorimetric distribution. It also makes it possible to search for regions that are coherent in compliance with a colorimetric criterion of the image, and then it can make use of an enlargement model on the pixels of the image. Such a model is known for establishing a survey of the colored pixels making up images and it can make use of a representation of color space such as that known as hue, saturation, and lightness (HSL).

Such a region-growing method may serve in particular to detect the sea in a bottom portion of the image arranged below the horizon line and the sky in the high portion of the image arranged above the horizon line.

Thereafter, the remaining pixels can be grouped together in connected regions so as to obtain regions including one or more looked-for landing areas. The connected regions that are present solely in the sky are removed since they generally correspond to clouds, smoke, or flying objects that do not correspond to landing areas that are being looked for.

The formation of coherent regions consists in assigning each pixel to an "HSL" region or to no HSL region if the color of the pixel is not in any of the dominant HSL region (or dominant colors of the image). Thereafter, the processor means serve to create connected regions of pixels belonging to a common HSL region.

The phenomenon of enlarging a pixel to a region is performed by applying a mathematical morphological tool corresponding to a closure. The structuring element selected for the closure is a circle of size much smaller than the minimum sizes for landing areas or groups of landing areas that are to be detected in the image. The size selected for the structuring element is of the order of one-tenth of the size of the objects that are to be detected.

The regions that are obtained are then identified as being potential landing areas and they can be displayed independently by the display means and then selected by the crew.

Thus, once the desired landing area has been selected by the crew, the control unit then enables the rotorcraft to be piloted automatically towards that desired landing area without any other action on the part of the pilot of the rotorcraft and to do so in a forward direction of the rotorcraft that includes at least a horizontal component.

Advantageously, the display member may serve to display various images respectively representative of a plurality of types of landing area to be looked for by the device, and the preselection means may be of the touch type and arranged directly on a display surface of the display member.

Thus, the display member serving to display an image representative of the looked-for landing area(s) and the means for selecting the desired landing area from among the looked-for landing area(s) may be a single member in the form of a selection touch screen.

Furthermore, the preselection touch screen may be the same as the selection touch screen and be formed by a single touch screen initially making it possible to preselect a type of landing area to be looked for, and subsequently to display at least one identified landing area corresponding to the preselected type of landing area, and finally to select a desired landing area.

In practice, the processor means may serve to identify in at least one image from the plurality of images at least one group including a plurality of looked-for landing areas corresponding to the type of landing area preselected via the preselection means. Under such circumstances, the display member may serve to display an image representative of the group(s) including a plurality of looked-for landing areas. The selection means may enable a desired group to be selected from among the group(s) including a plurality of looked-for landing areas.

In other words, the processor means serve to identify, in the images, connected regions having a plurality of landing areas such as ships or oil platforms. Such identification is particularly useful when the rotorcraft is flying towards a location having a plurality of groups of landing areas, such as a field of oil platforms that are very similar.

In a particular embodiment of the invention, the device may include calculation means for determining from an image of the desired landing area the distance between the rotorcraft and a geometrical center of the desired landing area.

When a landing area is marked on the ground by a circle, the thickness of the line forming the circumference of the circle may be standardized and may have a value of one meter in compliance with the "CAP 437—standards for offshore helicopter landing areas" legislation. For other landing areas, it is possible to define other categories of landing area as a function of the thickness of the circle, of the square, or of the triangle that marks a landing area on the ground or on a support surface. Depending on the type of landing area that has been preselected, a different algorithm may be used by the calculation means.

In addition, for a landing area marked by a predetermined circle, by using the angle ε at which the camera(s) see(s) the thickness of the circle, it is possible to calculate the distance $\underline{d}$ to the center of the landing area. The shape of the landing area seen by the camera is an ellipse corresponding to the deformed shape of the circle as seen by the camera(s) and as identified in the images, for which the equations can be calculated.

By using the small angle approximation, the following equation is obtained:

$$d = \frac{e}{\varepsilon}$$

where $\underline{e}$ is the thickness of the outline of the landing area equal to one meter. The value ε can be calculated by using projective geometry and the approximation of a pinhole camera. The pinhole approximation consists in assuming that all light rays pass through a single point (called the "pinhole") and are projected onto the plane on which the image is captured. The distance between the point and the plane is called the focal length f.

In accordance with the pinhole model, the point where the rays meet is defined as the origin of a rectangular reference frame for three-dimensional space with the $\underline{z}$ axis being the axis orthogonal to the image plane and going away from the image.

The point of coordinates (x,y,z) is projected onto the image plane as (x',y',z'), with $$x' = x*\frac{f}{z}, y' = y*\frac{f}{z}, \text{ and } z' = f$$

The angle at which an object is seen then corresponds to the size of the object on the image plane divided by the focal length. This approximation is valid only for small angles. Specifically, the pinhole approximation is not applicable for large angles. In particular, the size of the image is defined by a number of pixels: it is therefore necessary to multiply by a proportionality coefficient to convert angles into pixels. The device then reproduces a scene of characteristics that are known. Thus, by means of the camera, the scene is captured, and the images obtained make it possible to calculate the proportionality coefficient.

Thereafter, rotorcraft data such as its attitude and the position of the camera make it possible to identify the elevation angle of the rotorcraft defined as an angle $\partial$ between the horizon, the rotorcraft, and the landing area.

The calculation means begin by rotating the image taken by the camera through an angle that is opposite to the roll angle of the rotorcraft so as to obtain an upright image.

Thereafter, the angle $\partial$ is calculated initially by summing the pitching angle of the rotorcraft as supplied by onboard instruments plus the angle between a line of sight of the camera and a longitudinal axis of the rotorcraft (a value that is constant if the camera is stationary relative to the aircraft, otherwise, when it is movable, the angle can be transmitted to the calculation means by the camera system). The angle $\partial$ is then calculated by adding this sum to an angle measured on the image. The angle measured from the image corresponds to the angle between the line of sight of the camera and an axis passing through the camera and the center of the landing area. This angle measured on the image is thus obtained from data provided by the camera serving to define an angle from pixels and from the distance in pixels between the center of the landing area and the line of sight of the camera.

Thus, the horizontal distance is given by the following formula:

$$D_h = d*\cos(\partial)$$

The vertical distance or altitude difference is given by the formula:

$$D_v = d*\sin(\partial)$$

Furthermore, landing areas that satisfy the CAP 437 standard are circular in shape with an H in the center. When rotorcraft are remote form the vertical axis passing through the center of such a landing area, the landing area is seen in the form of an ellipse that can be characterized by a reduced equation in a rectangular reference frame having the following form:

$$\frac{((x\cos\theta + y\sin\theta) - x_E)^2}{a^2} + \frac{((-x\sin\theta + y\cos\theta) - y_E)^2}{b^2} = 1$$

where $E(x_E, y_E)$ is the center of the ellipse, θ is the orientation of the ellipse, a is the half-focal axis and b is the half-non-focal axis. Thus, in order to characterize an ellipse regardless of where it is located, the calculation means serve to determine these five parameters.

Document U.S. Pat. No. 4,618,989 gives an example of how to extract ellipse parameters from an image.

Advantageously, the calculation means can determine at least one approach path for the rotorcraft to approach the desired landing area. The display member can then display an image representative of the approach path(s) for the rotorcraft. The selection means can thus serve to select a selected approach path from among the approach path(s) for the rotorcraft. Finally, the control unit can generate a control setpoint enabling the rotorcraft to be piloted automatically substantially horizontally towards the desired landing area following the desired approach path.

The calculation means determine an approach path from data that is known or calculated such as the distance between the rotorcraft and the center of the ellipse, state parameters of the rotorcraft relative to three axes such as the components Vx, Vy, and Vz of a travel speed vector of the rotorcraft, a roll angle, a pitching angle, and a yaw angle, together with the movement if any of the camera relative to a reference position.

The crew of the rotorcraft can then confirm or refuse the proposed approach displayed on the display member. When the device specifies a non-compliant landing area, the crew can then force the device to guide the rotorcraft to the landing area where the crew desires to land. Thus, at all times, the crew keeps the power of decision over the device for assisting piloting. An occasion where the crew disagrees with the device may occur in rare circumstances such as a forced landing on a closed landing area, a landing area that does not comply with any of the standards defined in the device, or indeed a failure of one or more cameras.

In practice, the processor means may serve to identify in at least one image from among the plurality of images whether the desired landing area(s) include(s) an occluding element, and then to display an information message on the display member with the image representative of the desired landing area(s) including the occluding element.

A gradient filtering method is used within the landing area in order to reveal the H therein. Thereafter, a Hough transform can be applied to detect the line segments of the H. Thereafter, a search is made for the corners corresponding to the ends that are common to two segments in order to find the twelve corners corresponding to a set of twelve segments.

If the distance to the landing area is less than a certain predetermined value and if the H shape has still not been detected, the device can warn the crew of the rotorcraft. A failure to detect the H shape may occur under several circumstances, such as a landing area that is already occupied by a rotorcraft, or more generally a landing area that is closed and not to be landed on. In both situations, an alert is returned to the crew of the rotorcraft in order to recommend a procedure of disengaging the autopilot controlling the controls of at least one rotor of the rotorcraft.

In addition, it can happen that a rotorcraft standing on a landing area does not prevent the H shape being detected. Specifically, depending on the respective sizes of the rotorcraft and of the landing area, and also on the angle of the line of sight, the H shape may be fully visible. Nevertheless, in this specific circumstance, the rotorcraft on the ground might mask a portion of the outline of the landing area, and this can also be detected.

In an embodiment, the processor means may serve to identify in at least one image from among the plurality of images whether an immediate environment of the desired landing area(s) includes a prohibited area.

Such prohibited areas are areas of small size where stationary elements of height greater than safety values might be present in the immediate proximity of the landing area. Such a prohibited area is then marked as such at the periphery of the landing area with a particular symbol and/or with a particular color. It is then prohibited for any rotorcraft to approach the landing area by following an approach path that passes via the prohibited area.

Such prohibited areas can be detected in several steps, the first consisting in detecting elements of interest by colorimetric analysis. Specifically, the outlines of prohibited areas are generally represented by parallel red and white stripes that can be identified by colorimetric analysis. Thereafter, it is verified whether elements having these colors are indeed the marking in question, and finally the outline of the prohibited area in three-dimensional space is deduced therefrom.

The step of detecting colors is close to the method explained above. The search for straight lines in the appropriate colors is performed using a Hough transform in order to detect straight line segments.

Finally, detecting areas in three-dimensional space is done by orthogonally projecting the image of the landing area and the markings onto the plane containing the landing area in three-dimensional space.

Under such circumstances, the approach path(s) for the rotorcraft may serve to avoid a prohibited area present in the immediate environment of the desired landing area(s).

On the basis of the results obtained for locating the landing area and prohibited areas in its proximity, an approach path is then proposed and displayed on the display member. The status of the landing area can also be superimposed on the display to inform the pilot whether a rotorcraft is already present on the landing area or whether the landing area is closed.

Advantageously, the at least one camera may include a first camera arranged in a movable turret to adjust the orientation of a first line of sight of the first camera along an elevation angle and/or a relative bearing angle, the first camera possessing a first field of view and serving to obtain a panoramic image of the looked-for landing area(s). For example, the first field of view of the first camera may be a medium field of 30°×20°.

In practice, the camera(s) may include a second camera arranged in said movable turret for adjusting the orientation of a second line of sight of the second camera along an elevation angle and/or a relative bearing angle, the second camera possessing a second field of view smaller than the first field of view of the first camera and serving to obtain a high-resolution image of the looked-for landing area(s). For example, the second field of view of this second camera may be a small field of 5°×3.5°. The term "high-resolution" designates a resolution for the image obtained by the second camera that is greater than 250 pixels per inch (ppi).

A non-movable third camera having a wide angle of 110°×110° and facing downwards may serve to obtain an image of the landing area immediately prior to the stage of landing.

In an embodiment of the invention, the device may include at least one memory for storing information about the looked-for landing area(s), the display member enabling the information to be displayed simultaneously with and/or as a replacement for the corresponding image representative of the looked-for landing area(s).

By way of example, the information stored in this memory may comprise images or photographs for displaying on the display member. Such photographs of a landing area may in particular be at a resolution that is greater than the resolution of the images taken by the camera(s) of the device, or indeed they may have been taken at a particular angle or under weather conditions that are favorable.

As already mentioned, the invention also provides a rotorcraft that is remarkable in that it includes a device as described above for assisting piloting in order to enable the rotorcraft to be piloted during an approach stage preceding a stage of landing on a rotorcraft landing area.

Such a rotorcraft fitted with an above-described device for assisting in piloting is thus more efficient and consumes less fuel in order to reach a landing area located in the immediate proximity of other landing areas of the same type.

As already mentioned, a rotorcraft in accordance with the invention is also safer since it enables the crew to avoid landing areas that are unavailable or even closed. Finally, it also makes it possible for the crew of the rotorcraft to select an approach path while taking account of prohibited areas, if any.

The present invention also provides a method of assisting the piloting of a rotorcraft that is performed during an approach stage preceding a stage of landing on a rotorcraft landing area.

In addition, such a method is remarkable in that it comprises:

a preselection step for preselecting a type of landing area to be looked for by the method, the preselection step being performed by a crew member of the rotorcraft actuating preselection means;

an acquisition step for taking a plurality of images of the environment of the rotorcraft at least along a forward direction Dx of the rotorcraft;

a processing step for identifying in at least one image of the plurality of images at least one looked-for landing area corresponding to the type of landing area preselected during the preselection step;

at least one display step for at least displaying one image representative of the looked-for landing area(s);

at least one selection step performed by the crew of the rotorcraft at least to select one desired landing area among the looked-for landing area(s); and at least one control step for at least generating a control setpoint enabling the rotorcraft to be piloted automatically substantially horizontally towards the desired landing area.

In other words, such a method is particularly suitable for saving time when searching for a landing area where the landing area is located beside other landing areas of the same type, e.g. by way of example having the same shape or the same symbols. This method also makes it possible to reduce the work load on the crew of the rotorcraft when the rotorcraft is close to the desired landing area.

Advantageously, the processing step may serve to identify in at least one image from among the plurality of images at least one group including a plurality of looked-for landing areas corresponding to the type of landing area as preselected during the preselection step. Under such circumstances, the display step may serve to display an image representative of the group(s) including a plurality of looked-for landing areas. Finally, the selection step may serve to select a desired group from among the group(s) including a plurality of looked-for landing areas, and the control step can then generate a control setpoint enabling the rotorcraft to be piloted automatically substantially horizontally towards the desired group.

In practice, the method may include a calculation step on the basis of an image of the desired landing area to determine the distance between the rotorcraft and a geometrical center of the desired landing area.

In an implementation of the invention, the calculation step may determine at least one approach path for the rotorcraft in order to approach the desired landing area. The display step may then display an image representative of approach path(s) for the rotorcraft. Under such circumstances, the selection step may serve to select a desired approach path from among the at least one approach path for the rotorcraft. Thereafter, the control step may thus generate a control setpoint serving to pilot the rotorcraft automatically substantially horizontally towards the desired landing area following the desired approach path.

Advantageously, the processing step may serve to identify in at least one image from among the plurality of images whether the desired landing area(s) include(s) an occluding element, and then to display an information message during the display step with the image representative of the desired landing area(s) including the occluding element.

In practice, the processing step may serve to identify in at least one image from among the plurality of images whether an immediate environment of the desired landing area(s) includes a prohibited area.

In an implementation of the invention, the approach path(s) for the rotorcraft may serve to avoid a prohibited area present in the immediate environment of the at least one desired landing area.

Advantageously, the method may include at least one storage step for storing information about the looked-for landing area(s), the display step enabling the information to be displayed simultaneously with and/or as a replacement for the corresponding image representative of the looked-for landing area(s).

BRIEF DESCRIPTION OF THE DRAWINGS

The invention and its advantages appear in greater detail from the context of the following description of examples given by way of illustration and with reference to the accompanying figures, in which:

FIGS. 4 to 7 show various images or groups of images as displayed by the display member in accordance with the invention;

and

FIGS. 8 to 11 are flow charts illustrating variants of the method of assisting the piloting of a rotorcraft in accordance with the invention.

Elements present in more than one of the figures are given the same references in each of them.

DETAILED DESCRIPTION OF THE INVENTION

Figure 1:
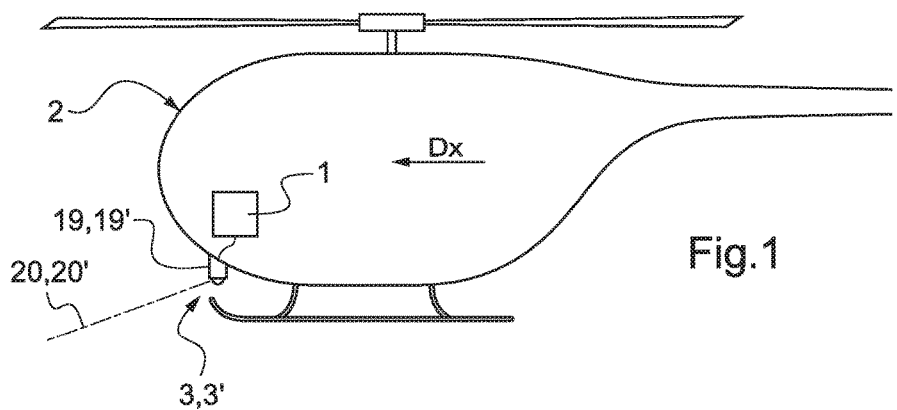
FIG. 1 is a diagrammatic side view of a rotorcraft in accordance with the invention.

As mentioned above, and as shown in FIG. 1, the invention relates to a device 1 for assisting the piloting of a rotorcraft 2, and to a rotorcraft 2 fitted with such a device 1 for assisting piloting. The device 1 is more particularly used by the crew of the rotorcraft 2 during a stage of approaching a landing area for a rotorcraft 2 prior to a stage of landing on the landing area.

Such a device 1 also includes at least one camera 3, 3' at least for taking a plurality of images of an environment of the rotorcraft 2 along a line of sight 20, 20'. By means of a movable turret 19, 19' the camera(s) 3, 3' can thus track a landing area on which the crew desires to land the rotorcraft 2.

As shown, the line of sight 20, 20' of the camera(s) 3, 3' points at least along a forward direction Dx of the rotorcraft 2 and enables the camera(s) 3, 3' to take the plurality of images of an environment of the rotorcraft 2 situated ahead of the rotorcraft 2 in this forward direction Dx. Thus, the plurality of images may include a horizon line and does not provide only plan view images of the environment situated below the rotorcraft 2.

Figure 2:
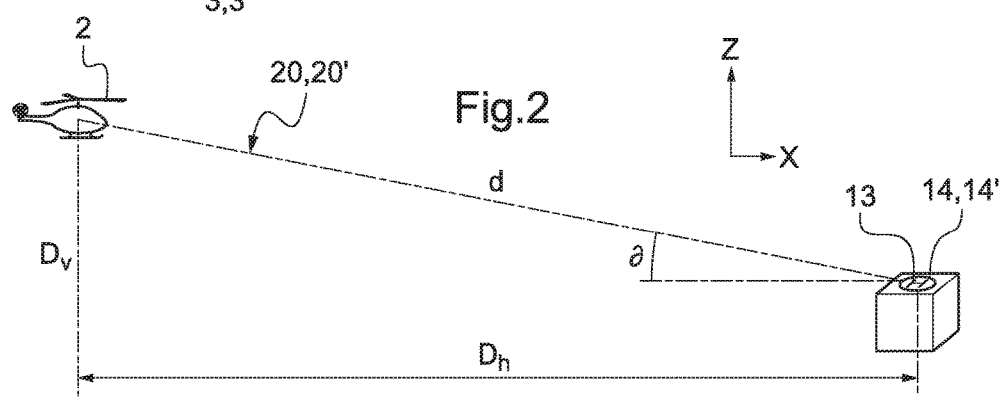
FIG. 2 is a diagrammatic side view of a rotorcraft during an approach stage to a landing area.

As shown in FIG. 2, the positioning of a rotorcraft 2 relative to a desired landing area 14 may be defined by a distance $\underline{d}$ between the rotorcraft 2 and a geometrical center 13 of the landing area 14, or indeed by a vertical distance Dv and a horizontal distance Dh corresponding to the projection of the distance $\overline{d}$ in an XZ reference frame where X is a horizontal axis and Z is a vertical axis.

Such a device 1 can thus process images from the camera(s) pointing along the line of sight 20, 20' to calculate the distances Dv and Dh between the rotorcraft 2 and the desired landing area 14.

Figure 3:
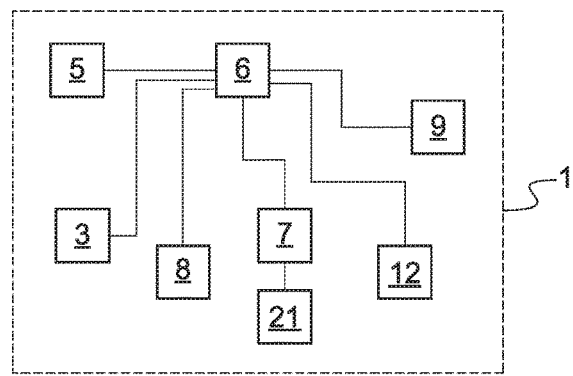
FIG. 3 is a block diagram showing a device in accordance with the invention for assisting the piloting of an aircraft.

Furthermore, and as shown in FIG. 3, a device 1 for assisting piloting also includes preselection means 5 enabling the crew to preselect a type 4 of landing area to be looked for subsequently by the device 1. As mentioned above, these preselection means may be formed in particular by a touch screen serving both to display the various types 4 of landing area and to preselect them.

In addition, such a device 1 includes processor means 6 for processing the images from the camera(s) 3, 3'. Such processor means 6 then make it possible to identify in the images provided by the camera(s) at least one looked-for landing area 14, 14' corresponding to the preselected type 4 of landing area.

A display member 7 then serves to display a selection of various looked-for landing areas 14, 14' identified by the processor means 6. Selection means 8 then enable the crew to select a desired landing area 14 from among the plurality of looked-for landing areas 14, 14' displayed on the display member 7.

Advantageously, and by way of example, such a display member 7 and the selection means 8 may be in the form of a touch screen, or indeed they may be the same as the above-mentioned touch screen forming the preselection means 5.

The device 1 also has a control unit 9 for generating a control setpoint for automatically piloting the rotorcraft 2 substantially horizontally towards the desired landing area 14.

Furthermore, the device 1 may also include calculation means 12 for using the images taken by the camera(s) to determine the distance $\overline{d}$ between the rotorcraft 2 and the geometrical center 13 of the desired landing area 14. Such distance information can thus be displayed by the display member 7 superimposed on the image representative the looked-for landing area 14, 14'.

Furthermore, such a device 1 may also include a memory 21 for storing information about the looked-for landing area 14, 14'. Under such circumstances, the display member 7 can then display this information simultaneously with the image representative of the looked-for landing area 14, 14'. The display member 7 can also serve to replace the image representative of the looked-for landing area 14, 14' as obtained from the camera(s) with another image as stored in the memory 21 and showing this looked-for landing area 14, 14'.

Figure 4:
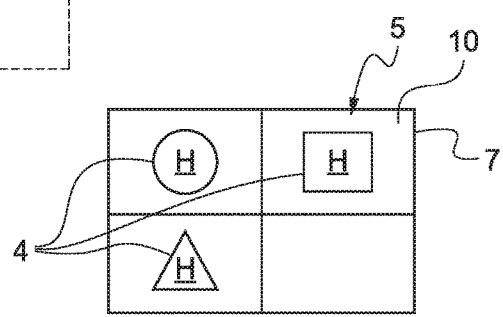

As shown in FIG. 4, and as already mentioned above, the preselection means 5 and the display member 7 may be formed by a single touch screen. Under such circumstances, the preselection means 5 are formed by a touchpad arranged in a display surface 10 of the display member 7.

The various types 4 of landing area can then be shown by way of example in the form of a circle, a quadrilateral, or a triangle.

As shown in FIG. 5, the processor means 6 may also serve to identify a plurality of groups 15, 15', 15" each having a plurality of looked-for landing areas 14, 14'. Under such circumstances, the display member 7 also serves to display a plurality of images corresponding to these various groups 15, 15', 15".

The selection member 8 then enables the crew to select one of these group 15 so as subsequently to enable the control unit 9 to generate a control setpoint for automatically piloting the rotorcraft 2 substantially horizontally towards the selected group 15 that comprises a plurality of looked-for landing areas 14, 14'.

Furthermore, the calculation means 12 may also serve to determine at least one approach path 16, 16', 16" enabling the rotorcraft 2 to approach the desired landing area 14. Under such circumstances, and as shown in FIG. 6, the display member 7 can then also serve to display these approach paths 16, 16', 16".

The selection member 8 then enables the crew to select a desired one of the approach paths 16 so as subsequently to enable the control unit 9 to generate a control setpoint enabling the rotorcraft 2 to be piloted automatically substantially horizontally towards the desired landing area 14 with the desired approach path 16.

As shown in FIG. 7, the processor unit 6 can also serve to identify an occluding element 17 present in a desired landing area 14. By way of example, such an occluding element 17 may be another rotorcraft already present on the desired landing area 14.

In addition, an occluding element 17 may be detected by processing images from the camera 3 at several hundreds of meters from the desired landing area 14. Consequently, such a device 1 enables a crew to anticipate a change of desired landing area 14' long before direct visual detection by the crew of the rotorcraft 2.

Likewise, the processor member 6 can also serve to identify a prohibited area 18 present in the environment of a desired landing area 14.

Thus, a prohibited area 18 may be detected by processing images from the camera 3 at several hundred meters from the desired landing area 14. Consequently, such a device 1 makes it possible to propose approach paths 16, 16', 16" to the crew that exclude the detection prohibited area 18.

As shown in FIG. 8, the invention also relates to a method 30 of assisting the piloting of a rotorcraft 2 as performed during a stage of approaching a landing area 14, 14'. Such a method 30 thus includes a plurality of steps running on from one another in succession.

Furthermore, the method 30 includes a preselection step 31 enabling a crew of the rotorcraft 2 to preselect a type 4 of landing area that is subsequently to be looked for.

The method 30 then includes an acquisition step 32 serving to acquire images of the environment of the rotorcraft 2 along a line of sight 20, 20' by using one or more camera(s) 3, 3'.

A processing step 33 then serves to identify at least one looked-for landing area 14, 14' from among a plurality of images from the camera(s) 3, 3'. A display step 34 then serves to display the looked-for landing area(s) 14, 14'.

Furthermore, the method 30 includes a selection step 35 for selecting a desired landing area 14 from among the looked-for landing area(s) 14, 14'.

Finally, the method 30 includes a control step 36 seeking to generate a control setpoint for automatically piloting the rotorcraft 2 substantially horizontally during the approach stage towards the desired landing area 14.

As shown in FIG. 9, the method 40 of assisting piloting may also include a branch 47 of additional steps, this branch 47 being performed in parallel with the display and selection steps 34 and 35.

Thus, the branch 47 may include a display step 44 for at least displaying one image representative of a group 15, 15', 15" comprising a plurality of looked-for landing areas 14, 14'. Under such circumstances, the step 33 of processing the images from the camera(s) 3, 3' also serves to identify these groups 15, 15', 15".

The branch 47 then includes a selection step 45 enabling the crew of the rotorcraft 2 to select an image representative of the desired group 15 from among the one or more images representative of groups 15, 15', 15" including a plurality of looked-for landing areas 14, 14'.

Finally, such a branch 47 includes a control step 46 serving during the approach stage to generate a control setpoint enabling the rotorcraft 2 to be piloted automatically towards the desired group 15.

Likewise, and as shown in FIG. 10, the method 50 of assisting piloting may also include a branch 57 of additional steps, this branch 57 taking place in parallel with the control step 36.

Such a branch 57 of the method 50 then includes a calculation step 51 for using the images taken by the camera(s) 3, 3' to determine the distance $\overline{d}$ between the rotorcraft 2 and the geometrical center 13 of the landing area 14, 14'. Such a calculation step 51 then also serves to determine at least one approach path 16, 16', 16' for the rotorcraft 2 in order to approach the desired landing area 14.

A display step 54 then serves to display the approach path(s) 16, 16', 16" for the rotorcraft 2 superimposed on the image of the desired landing area 14, followed by a selection step 55 enabling the crew of the rotorcraft 2 to select a desired path 16.

Finally, such a branch 57 also includes a control step 56 serving to generate a control setpoint for automatically piloting the rotorcraft substantially horizontally towards the desired landing area 14 following the desired approach path 16.

As shown in FIG. 11, another variant 60 of the method of assisting piloting may also include a storage step 61 of storing information in a memory 21 about the looked-for landing area(s) 14, 14'.

Thereafter, while displaying an image representative of the looked-for landing area(s) 14, 14', the display step 64 enables information stored in the memory 21 to be displayed, e.g. superimposed thereon.

Furthermore, it is also envisaged replacing the image taken by the camera(s) 3, 3' with an image of the looked-for landing area 14, 14' as stored in the memory 21. Such an image stored in the memory 21 may be taken with resolution that is better than that of the image from the camera(s) 3, 3', or indeed at a particular viewing angle or under weather conditions and/or lighting conditions that are optimum for displaying images on the display member 7 of the piloting assistance device 1.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A device for assisting the piloting of a rotorcraft in order to enable a rotorcraft to be piloted during an approach stage preceding a stage of landing on a rotorcraft landing area, wherein the device comprises:
    preselection means for preselecting a type of landing area to be looked for by the device, the preselection means being actuated by a crew member of the rotorcraft;
    at least one camera for taking a plurality of images of the environment of the rotorcraft along a line of sight, the line of sight pointing at least in a forward direction Dx of the rotorcraft;
    processor means for identifying in at least one image from among the plurality of images at least one looked-for landing area corresponding to the type of landing area preselected via the preselection means;
    a display member for at least displaying an image representative of the at least one looked-for landing area;
    selection means enabling the crew of the rotorcraft to select a desired landing area from among the at least one looked-for landing area; and
    a control unit for generating a control setpoint enabling the rotorcraft to be piloted automatically substantially horizontally towards the desired landing area.

2. The device according to claim 1, wherein the display member serves to display various images respectively representative of a plurality of types of landing area to be looked for by the device, and the preselection means are of the touch type and are arranged directly on a display surface of the display member.

3. The device according to claim 1, wherein:
    the processor means serve to identify in at least one image from the plurality of images at least one group including a plurality of looked-for landing areas corresponding to the type of landing area preselected via the preselection means;
    the display member serves to display an image representative of the at least one group including a plurality of looked-for landing areas; and
    the selection means enable a desired group to be selected from among the at least one group including a plurality of looked-for landing areas.

4. The device according to claim 1, wherein the device includes calculation means for using an image of the desired landing area to determine the distance $\overline{d}$ between the rotorcraft and a geometrical center of the desired landing area.

5. The device according to claim 4, wherein:
    the calculation means determine at least one approach path for the rotorcraft in order to approach the desired landing area;
    the display means display an image representative of the at least one approach path for the rotorcraft;
    the selection means serve to select a desired approach path from among the at least one approach paths for the rotorcraft; and
    the control unit (9) generates a control setpoint enabling the rotorcraft to be piloted automatically substantially horizontally towards the desired landing area following the desired approach path.

6. The device according to claim 5, wherein the processor means serve to identify in at least one image from among the plurality of images whether an immediate environment of the at least one desired landing area includes a prohibited area, and wherein at least one approach path for the rotorcraft serves to avoid a prohibited area present in the immediate environment of the at least one desired landing area.

7. The device according to claim 1, wherein the processor means serve to identify in at least one image from among the plurality of images whether the at least one desired landing area includes an occluding element, and then to display an information message on the display member with the image representative of the at least one desired landing area including the occluding element.

8. The device according to claim 1, wherein the processor means serve to identify in at least one image from among the plurality of images whether an immediate environment of the at least one desired landing area includes a prohibited area.

9. The device according to claim 1, wherein the at least one camera includes a first camera arranged in a movable turret to adjust the orientation of a first line of sight of the first camera along an elevation angle and/or a relative bearing angle, the first camera possessing a first field of view and serving to obtain a panoramic image of the at least one looked-for landing area.

10. The device according to claim 9, wherein the at least one camera includes a second camera arranged in a movable turret for adjusting the orientation of a second line of sight of the second camera along an elevation angle and/or a relative bearing angle, the second camera possessing a second field of view smaller than the first field of view of the first camera and serving to obtain a high-resolution image of the at least one looked-for landing area.

11. The device according to claim 1, wherein the device includes at least one memory for storing information about the at least one looked-for landing area, the display member enabling the information to be displayed simultaneously with and/or as a replacement for the corresponding image representative of the at least one looked-for landing area.

12. A rotorcraft, including at least one device for assisting piloting in accordance with claim 1 in order to enable the rotorcraft to be piloted during an approach stage preceding a landing stage on a rotorcraft landing area.

13. A method of assisting the piloting of a rotorcraft, the method being performed during an approach stage preceding a stage of landing on a rotorcraft landing area, wherein the method comprises:
  a preselection step for preselecting a type of landing area to be looked for by the method, the preselection step being performed by a crew member of the rotorcraft actuating preselection means;
  an acquisition step for taking a plurality of images of the environment of the rotorcraft at least along a forward direction Dx of the rotorcraft;
  a processing step for identifying in at least one image of the plurality of images at least one looked-for landing area corresponding to the type of landing area preselected during the preselection step;
  at least one display step for at least displaying one image representative of the at least one looked-for landing area;
  at least one selection step performed by the crew of the rotorcraft at least to select one desired landing area among the at least one looked-for landing area; and
  at least one control step for at least generating a control setpoint enabling the rotorcraft to be piloted automatically substantially horizontally towards the desired landing area.

14. The method according to claim 13, wherein:
  the processing step serves to identify in at least one image from among the plurality of images at least one group including a plurality of looked-for landing areas corresponding to the type of landing area preselected during the preselection step;
  the display step serves to display an image representative of the at least one group including a plurality of looked-for landing areas;
  the selection step serves to select a desired group from among the at least one group including a plurality of looked-for landing areas; and
  the control step generates a control setpoint enabling the rotorcraft to be piloted automatically substantially horizontally towards the desired group.

15. The method according to claim 13, wherein the method includes a calculation step on the basis of an image of the desired landing area to determine the distance $\overline{d}$ between the rotorcraft and a geometrical center of the desired landing area.

16. The method according to claim 15, wherein:
  the calculation step determines at least one approach path for the rotorcraft in order to approach the desired landing area;
  the display step displays an image representative of the at least one approach path (for the rotorcraft;
  the selection step serves to select a desired approach path from among the at least one approach path for the rotorcraft; and
  the control step generates a control setpoint serving to pilot the rotorcraft automatically substantially horizontally towards the desired landing area following the desired approach path.

17. The method according to claim 16, wherein the processing step serves to identify in at least one image from among the plurality of images whether an immediate environment of the at least one desired landing area includes a prohibited area, and wherein the at least one approach path for the rotorcraft serves to avoid a prohibited area present in the immediate environment of the at least one desired landing area.

18. The method according to claim 13, wherein the processing step serves to identify in at least one image from among the plurality of images whether the at least one desired landing area includes an occluding element and then to display an information message during the display step with the image representative of the at least one desired landing area including the occluding element.

19. The method according to claim 13, wherein the processing step serves to identify in at least one image from among the plurality of images whether an immediate environment of the at least one desired landing area includes a prohibited area.

20. The method according to claim 13, wherein the method includes at least one storage step for storing information about the at least one looked-for landing area, the display step enabling the information to be displayed simultaneously with and/or as a replacement for the corresponding image representative of the at least one looked-for landing area.

* * * * *